United States Patent
Labuda (10) Patent No.: US 7,092,768 B1
(45) Date of Patent: Aug. 15, 2006

(54) DISTRIBUTED CONTROL SYSTEM

(75) Inventor: David S. Labuda, Los Altos Hills, CA (US)

(73) Assignee: Liquid Sky Studios, Inc., Palo Alto, CA (US)

( * ) Notice: Subject to any disclaimer, the term of this patent is extended or adjusted under 35 U.S.C. 154(b) by 110 days.

(21) Appl. No.: 10/796,904

(22) Filed: Mar. 9, 2004

(51) Int. Cl.
*G05B 13/02* (2006.01)

(52) U.S. Cl. .................. 700/19; 700/20; 700/65; 700/60; 709/201; 709/217; 340/3.1; 340/3.71; 340/825.22; 455/3.03; 455/92; 455/352

(58) Field of Classification Search .............. 700/2–5, 700/19, 20, 65, 66; 340/3.1, 3.71, 825.22; 455/3.03, 92, 352; 709/217, 330, 201
See application file for complete search history.

(56) References Cited

U.S. PATENT DOCUMENTS

| | | | | |
|---|---|---|---|---|
| 4,644,320 A | * | 2/1987 | Carr et al. ............. | 340/310.16 |
| 5,237,305 A | * | 8/1993 | Ishikuro et al. ........ | 340/286.01 |
| 5,436,510 A | * | 7/1995 | Gilbert .................. | 307/38 |
| 5,769,527 A | * | 6/1998 | Taylor et al. ............ | 362/85 |
| 5,927,598 A | * | 7/1999 | Broe ..................... | 236/46 R |
| 6,487,509 B1 | * | 11/2002 | Aisa ..................... | 702/62 |
| 6,748,278 B1 | * | 6/2004 | Maymudes ............. | 700/17 |
| 6,832,135 B1 | * | 12/2004 | Ying .................... | 700/295 |
| 6,862,498 B1 | * | 3/2005 | Davis et al. ............ | 700/295 |
| 6,892,026 B1 | * | 5/2005 | Ishii et al. ............. | 396/48 |
| 6,907,301 B1 | * | 6/2005 | Kou et al. .............. | 700/19 |
| 2005/0159823 A1 | * | 7/2005 | Hayes et al. ........... | 700/19 |

OTHER PUBLICATIONS

UPnP Technology Newsletter, UPnP Forum, http://www.upnp.org, Aug. 29, 2003.

* cited by examiner

*Primary Examiner*—Ramesh Patel
(74) *Attorney, Agent, or Firm*—Van Pelt, Yi & James LLP (57) ABSTRACT

A technique is disclosed for controlling a plurality of devices in a building. The technique includes detecting a first network event at a first device, updating a network state on the first device based on the first network event, determining at the first device an action based on the network state, and transmitting a second network event to a second device.

49 Claims, 10 Drawing Sheets

| Network State | | | | |
|---|---|---|---|---|
| Screen | Half Down | | | |
| Video | Active | Source DVD | Stop | |
| DVD | On | Movie Loaded | Stop | |
| PVR | Off | | | |
| Light 1 | On | 30% Dimmed | | |
| Light Circuit 1 | On | Scene 1 | | |
| Sprinklers | On | Low | 10 min remaining | |
| HVAC | Off | 65F | | |
| Window 1 | Open | 20% Open | | |
| Washer | On | Normal | Cold | 5 min remaining |
| Security System | Off | | | |
| Scene 1 | On | | | |
| Theater Mode | On | | | |

DISTRIBUTED CONTROL SYSTEM

FIELD OF THE INVENTION

The present invention relates generally to control systems. More specifically, controlling a plurality of devices in a building is disclosed.

BACKGROUND OF THE INVENTION

Control systems provide electronic control of home or office devices, such as lighting and distributed audio systems. Most existing systems include a central processing unit. Dependence on a central processing unit creates a single point of failure. Because control is not localized, the network becomes another single point of failure. For example, if there is a switch that controls lights in a room, and there is a network failure between the switch and the central processing unit, the switch can no longer control the lights in the room.

All devices being controlled are wired back to the central processing unit. For example, in an electronically controlled building, each lighting circuit must have its own electrical wiring all the way back to the dimming module. This creates a large increase in the amount and complexity of the electrical wiring in a building. Because of the cost and complexity of the wiring, most implementations are wired so that related fixtures are all wired together on one lighting circuit. This leaves little room for flexibility in the system once it is fully installed.

It would be desirable to develop a control system that does not rely on a central processing unit and in which devices are locally controlled, both logically and physically.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A plurality of devices in a building may be controlled using the techniques described herein. In some embodiments, a first device detects a network event, updates a network state, determines an action, and broadcasts a second network event to the devices. Typically, devices are controlled by a home control system and the building is a home that includes devices such as an HVAC system, a home security system, personal computers, a sprinkler system, and a home theater. The home theater includes devices such as a screen, a projector, a DVD player, a personal video recorder (PVR), and a digital satellite system (DSS) receiver. In one embodiment, the building is an office that includes lighting systems, a heating, ventilating, and air conditioning (HVAC) system, a security system, personal computers, and a telephone system.

Figure 1A:
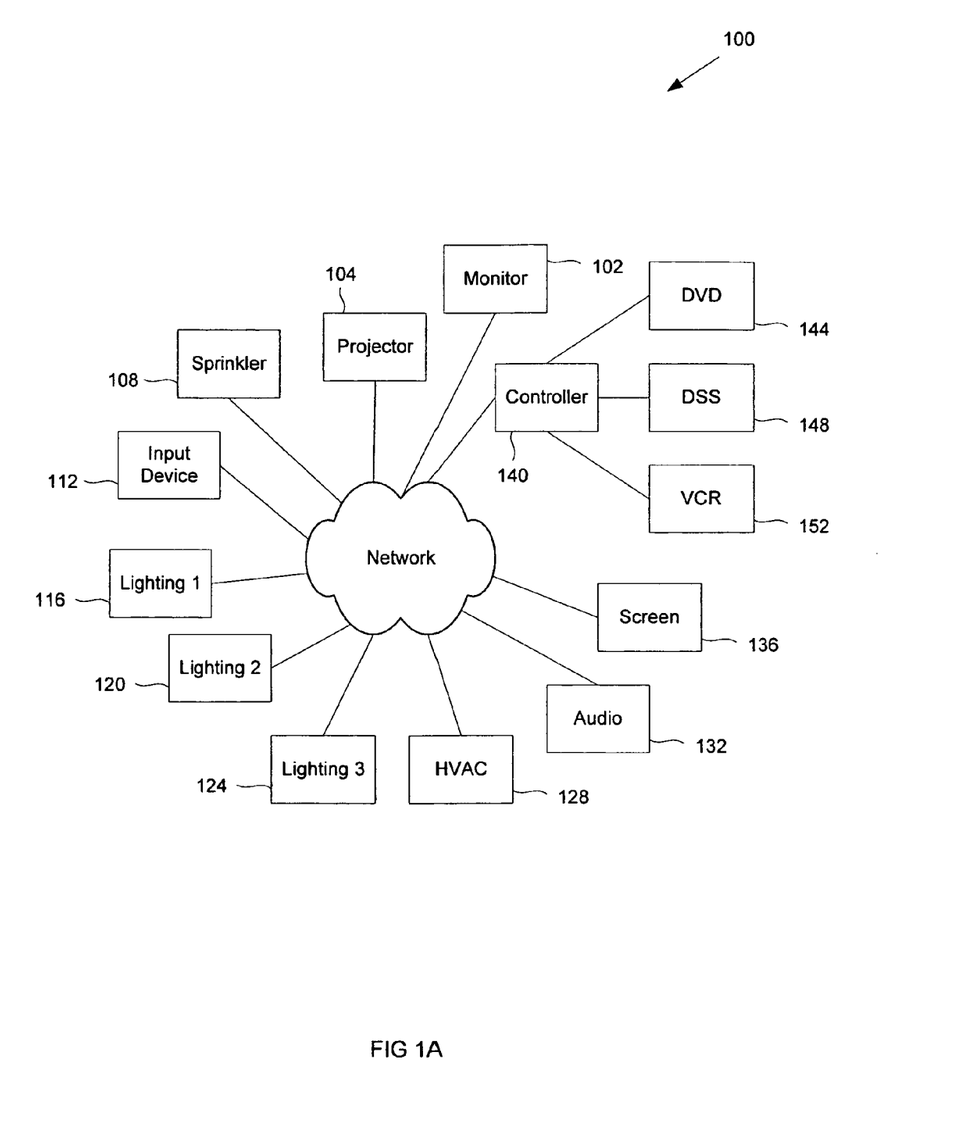
FIG. 1A is a block diagram illustrating a network for controlling a plurality of devices in a building.

FIG. 1A is a block diagram illustrating a network 100 for controlling a plurality of devices in a building. In this example, network 100 includes a monitor 102, a projector 104, a sprinkler 108, an input device 112, a lighting device 116, a lighting device 120, a lighting device 124, an HVAC system 128, an audio source 132, a screen 136, and a controller 140. Controller 140 controls three audio video sources including a DVD player 144, a DSS receiver 148, and a VCR 152. Network 100 may be configured in a star, bus, ring, or other network topology. In various embodiments, network 100 includes a wireless device. For example, the temperature of a room set by HVAC 128 is controlled over a wireless connection. In some embodiments, network 100 is a local area network based on an IEEE 802.11 standard.

Monitor 102 monitors a network state. A network state, as used herein, includes state information for each device on the network. Monitor 102 may be, for example, a personal digital assistant (PDA), a PC, or a touch screen device.

In some embodiments, lighting device 116 controls the lights in a room, lighting device 120 controls outdoor lights, and lighting device 124 controls various lights throughout the home. Input device 112 is a device that accepts user inputs, for example, to request theater mode. For example, input device 112 may be a touch screen or a remote control.

A mode may be defined so that devices behave in a prescribed way when a mode is active. For example, theater mode may be defined such that requesting theater mode dims the lights in a home theater, lowers a screen, warms up a projector once the screen is half lowered, and turns on a DVD player or an audio video processor. Once a movie is being played, if the DVD player is paused, the lights turn up. Other modes may be defined. For example, vacation mode may be defined such that when vacation mode is active, the last three days of events are reexecuted.

In some embodiments, each device includes a controller that includes a small processing unit. The controller may be a generic controller that is not specific to any device it controls. A controller may control a device over an IR, serial, or any other type of connection. For example, controller 140 may have three IR outlets or a combination of IR and serial outlets. A controller may control more than one device. For example, controller 140 controls three devices.

For example, a typical system may include a lighting circuit, a group of lighting circuits, a screen, and a remote control, each controlled by a separate controller. A projector and a DSS receiver are controlled by a single controller and a DVD and a PVR are controlled by a single controller.

In some embodiments, the devices are configured using a central programming/distributed execution technique. In one such embodiment, the devices are centrally programmed on a PC that is connected to the network. The PC downloads an executable to each device so each device has the programming it needs to function. The PC then may be disconnected from the network. In this way, a single device can be updated with new programming. Each device contains the programming that defines the behavior for the device. In some embodiments, the devices are individually programmed. In some embodiments, the devices are configured using a combination of central programming and individual programming.

The devices are controlled using a broadcast based technique. In some embodiments, the devices can send and receive messages from anywhere in the network. In some embodiments, each device broadcasts network events as they occur. Each device responds to detected network events accordingly. Further details of the broadcast based technique are discussed in conjunction with FIG. 1B.

Figure 1B:
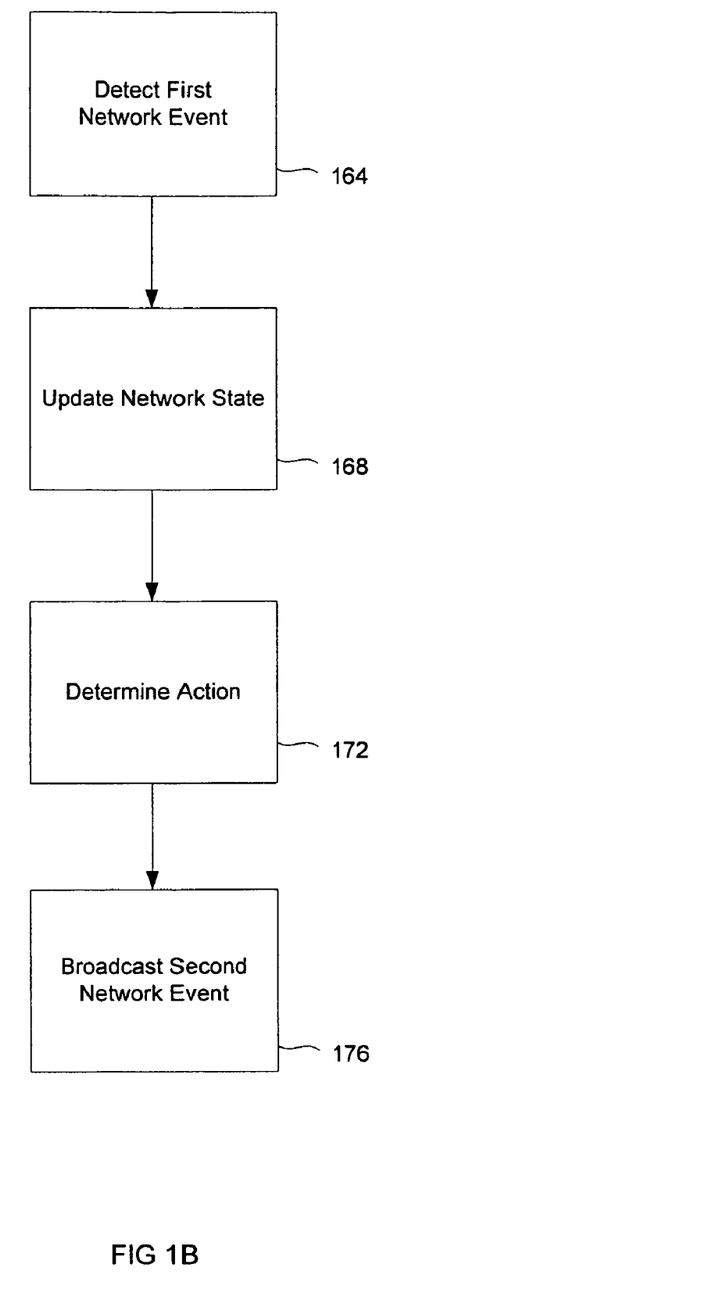
FIG. 1B is a flowchart illustrating a method for controlling a device.

FIG. 1B is a flowchart illustrating a method for controlling a device. A device detects a first network event (164). A network event includes events that may affect a device on the network. Events may be communicated using messages. Network events may be event based (sequential or event driven), time based, timer based, or user based (user injected). For example, an event based network event might be triggered when a DVD player turns on or the temperature changes. A timer based network event might be triggered when 20 minutes is up if a sprinkler is programmed to turn off after this period. A time based event might be triggered when it is 11 PM and a light is programmed to turn off at this time. A user based network event might be triggered by a user request, such as a request to turn on a security system or to generate a lighting scene. A lighting scene is a predefined state of one or more lights. For example, a lighting scene for a room might include a ceiling light that is off, a night light that is on, and a desk light dimmed by 20%.

A network state on the device is updated (168). Each device may track the network state or a filtered network state. The filtered network state is a subset of the network state. For example, a PVR might track a filtered network state that only includes state information for audio, video, and lighting devices because the PVR may only interact with these devices. A device may track its own state. In some embodiments, a device tracks a filtered network state that includes the device state. In some embodiments, a device tracks the network state and the network state includes the device state.

When a device fails, it recaptures its state prior to failing. When the device comes back up, it queries the network for its state prior to failing and reestablishes itself in that state. In some embodiments, the device my recapture its state from a local memory.

An action is determined (172) based on the network state. The action may be determined before or after the network state on the device is updated (168). For example, the action determined may be to stand by. The action is performed after it is determined and the state of the device is updated to reflect that the action is performed.

For certain actions the device broadcasts a second network event associated with the action (176). Certain actions may take some time to perform and an update of the device state may be updated at the beginning and the end of an action and the device would then broadcast a third network event indicating that the action is finished. Other devices receive the broadcast message and determine that the action was successful.

For example, assume that projector 104 detects a network event indicating that screen 136 is half lowered. The network state of projector 104 is updated to include the state of screen 136. The action determined is to turn on and warm up projector 104. Projector 104 is turned on and another event is broadcast, this time indicating that projector 104 is warming up. When the projector is finished warming up, its network state is updated and the projector broadcasts a network event indicating it is ready or warmed up.

In some embodiments, a reliable protocol is used to ensure that all devices receive communications. For example, messages may be relayed among devices with acknowledgments of messages provided to ensure receipt by each device.

Figure 2:
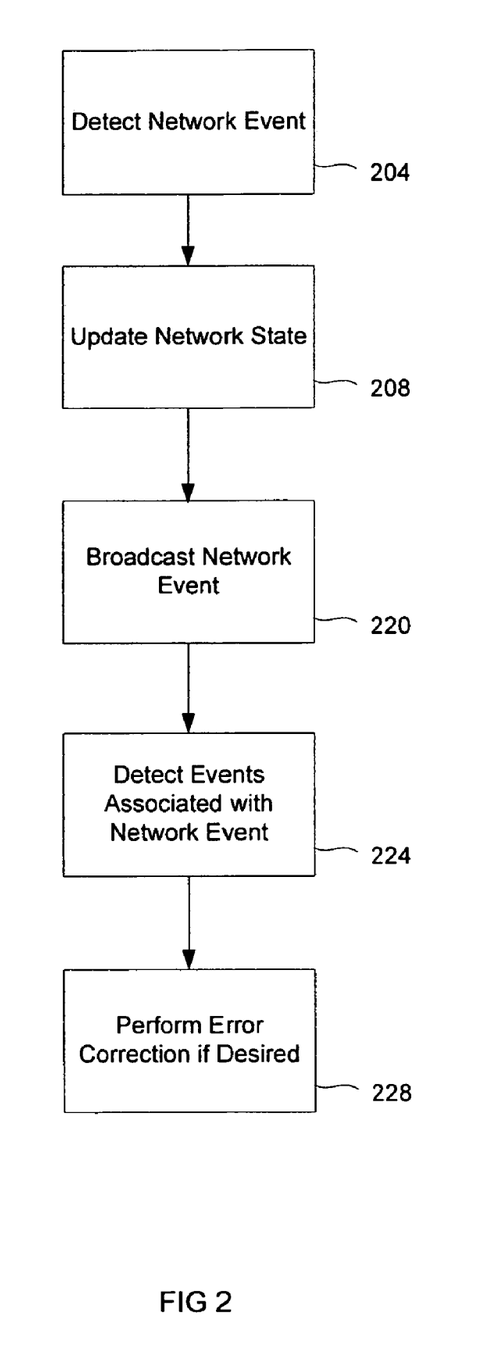
FIG. 2 is a flowchart illustrating a method for triggering a network event using an input device.

FIG. 2 is a flowchart illustrating a method for triggering a network event using an input device. In this example, a network event is injected into a network as a result of a user request. A network event is detected by an input device (204). For example, a user may press a button on an input device to select theater mode or turn on a light. The network state on the input device is updated (208). The updated network state may be displayed to the user using LEDs or other display means. The network event is broadcast (220). Events associated with the network event are detected (224) by the input device or another device. If applicable, error correction may be performed (228).

For example, assume that a user presses a button on the input device to select theater mode. The input device detects the network event (204) and updates its state (208) to reflect that theater mode is requested. The input device broadcasts the network event associated with the theater mode request (220). A DVD player receives the network event associated with the theater mode request, powers on, and broadcasts a network event indicating that the DVD player is powered on. The input device detects the network event indicating that the DVD player is powered on before a time out period (224). If the network event is detected after a time out period, the input device may rebroadcast a request to turn on the DVD player (228). Alternatively, other types of error correction may be performed.

Figure 3:
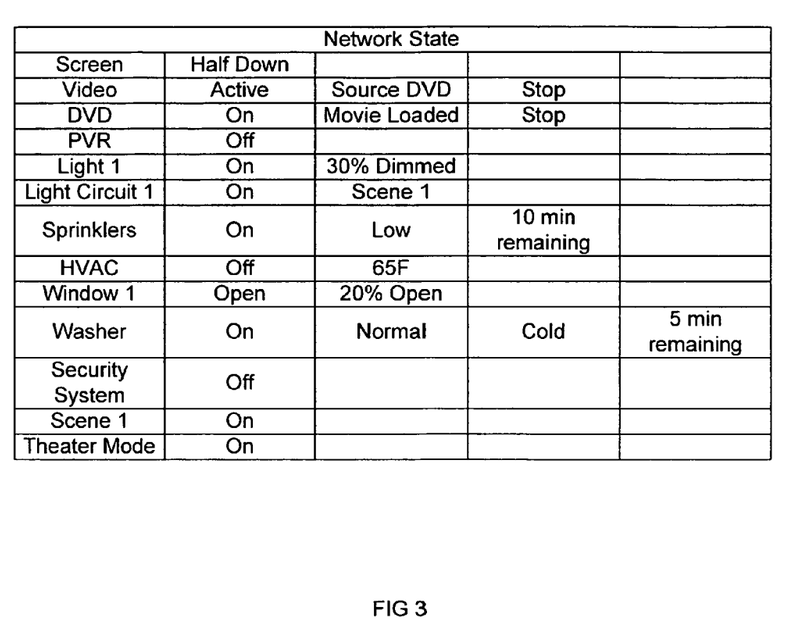
FIG. 3 is a diagram illustrating a logical representation of a network state.

FIG. 3 is a diagram illustrating a logical representation of a network state. In this example, the network state is logically represented by a table. The first column of the table includes devices or other objects that have state information. The remaining columns include state information for each device or object. For example, light 1 may control a bedroom light that is on and 30% dimmed. Lighting circuit 1 may control a plurality of lights on a lighting circuit that is set to scene 1. Theater Mode is on or active.

Each device tracks the network state. In one embodiment, each device tracks a filtered network state. The filtered network state is a subset of the network state. For example, light 1 may track a filtered network state that includes state information about light 1 and about other devices that might affect light 1, such as a DVD player, if light 1 is programmed to fade when the DVD player begins playing. A controller of three devices may maintain a filtered network state that includes state information about the three devices and devices that might affect the controller. For example, if the controller controls a DVD player, a DSS receiver, and a PVR, its filtered network state includes state information about the DVD player, the DSS receiver, the PVR, a screen, light 1, and lighting circuit 1.

Figure 4:
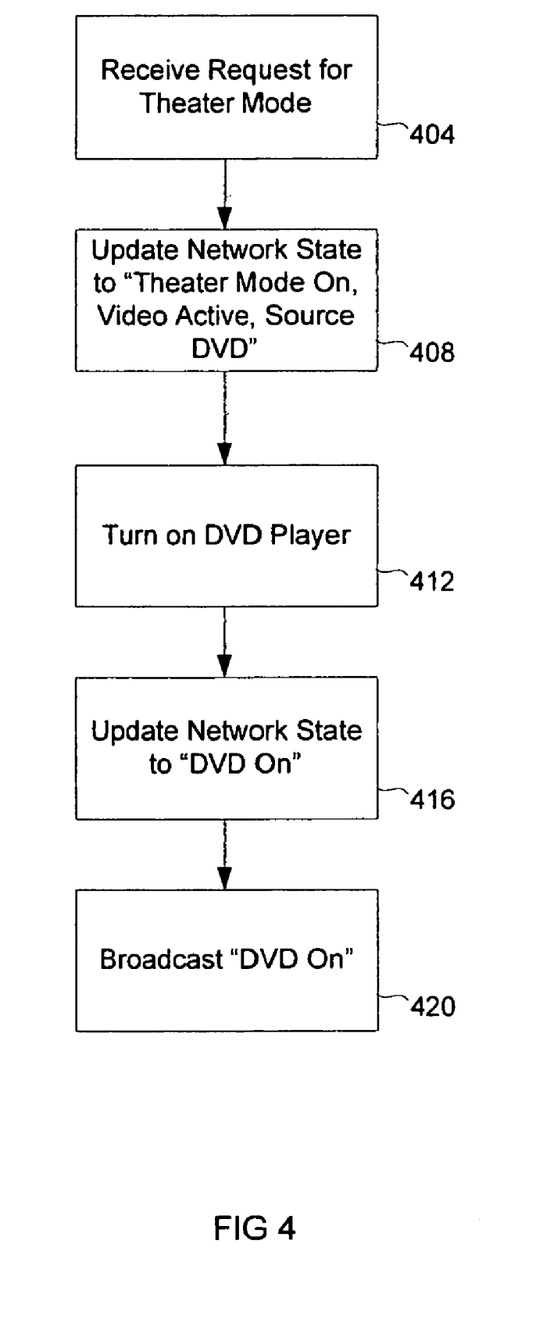
FIG. 4 is a flowchart illustrating a method for responding to a theater mode network event on a controller.

FIG. 4 is a flowchart illustrating a method for responding to a theater mode network event on a controller. In this example, the controller controls a DVD player over an IR, serial, or other type of connection. A request for theater mode is received (404). For example, the request may be received by detecting a network event, such as the network event broadcast in step 220. The network state on the controller is updated to reflect the received request (408). For example, if the controller network state is represented by the table in FIG. 3, the "theater mode" state is updated to "on" and the "video" state is updated to "active, source DVD". The DVD player is turned on (412). The network state on the DVD player is updated to reflect that the DVD player is on (416). A network event associated with the DVD player turning on is broadcast (420).

Figure 5:
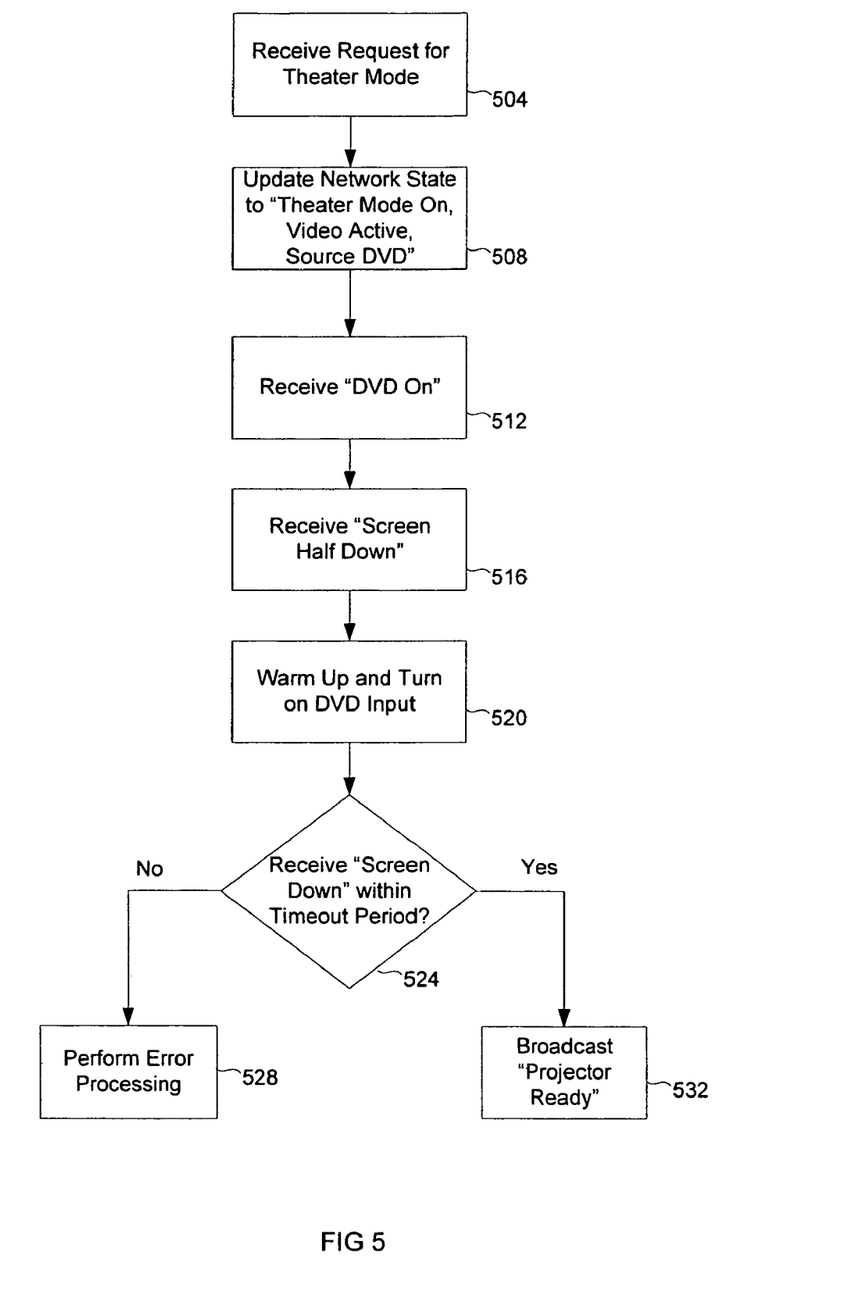
FIG. 5 is a flowchart illustrating a method for responding to a theater mode network event on a projector.

FIG. 5 is a flowchart illustrating a method for responding to a theater mode network event on a projector. In this example, when a network enters theater mode, a video source turns on and a screen starts to lower. Once the screen is half lowered, a projector turns on. A request for theater mode is received (504). For example, the request may be received by detecting a network event, such as the network event broadcast in step 220. The network state on the projector is updated to reflect the received request (508). For example, if the projector network state is represented by the table in FIG. 3, the "theater mode" state is updated to "on" and the "video" state is updated to "active, source DVD". A message indicating that the DVD player is on is received (512). For example, the request may be received by detecting a network event such as the network event broadcast in step 420. In another example, a message indicating that an audio video processor is ready is received. A message indicating that the screen is half down is received (516). For example, the request may be received by detecting a network event such as the network event broadcast in step 620. The projector begins to warm up and the DVD input is turned on (520). It is determined whether a message indicating that the screen is fully down is received within a time out period (524). If it is, a network event indicating that the projector is ready is broadcast (532). If the message is not received within the time out period, appropriate error processing or error correction is performed (528). Alternatively, a network event indicating that the projector is ready may be broadcast (532) as soon as the projector is warmed up.

Figure 6:
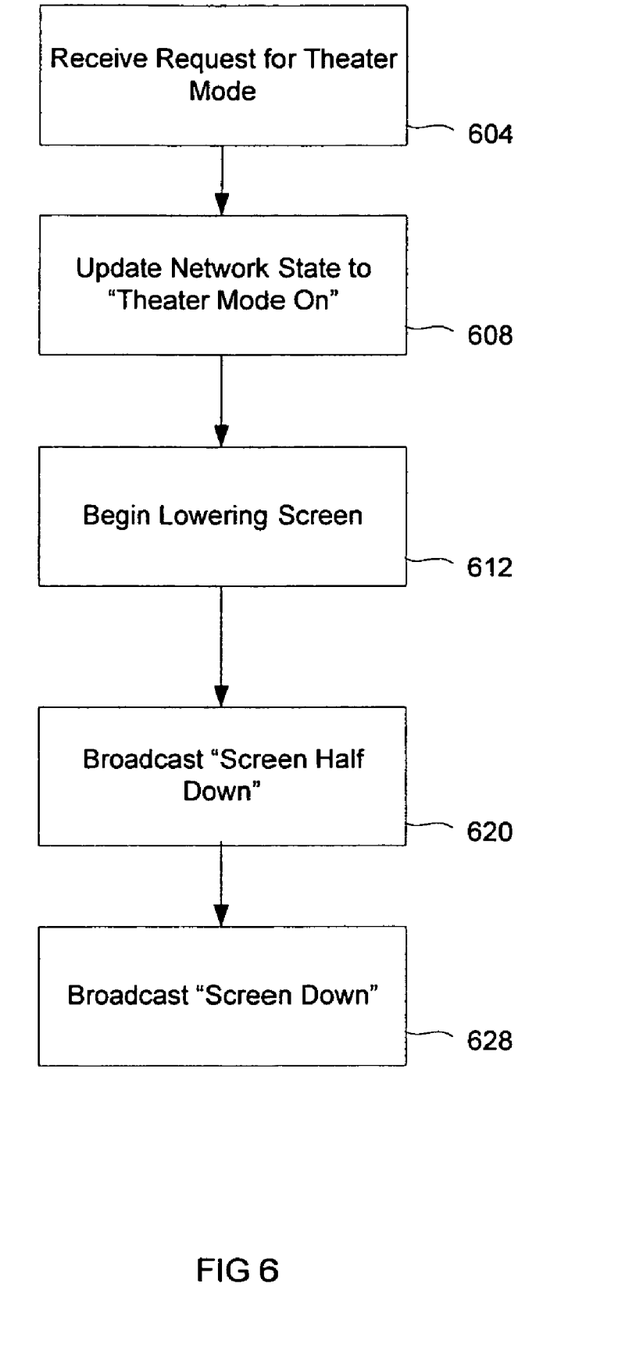
FIG. 6 is a flowchart illustrating a method for responding to a theater mode network event on a screen.

FIG. 6 is a flowchart illustrating a method for responding to a theater mode network event on a screen. In this example, a request for theater mode is received (604). For example a request may be received by detecting a network event, such as the network event broadcast in step 220. The network state on the screen is updated to reflect the received request (608). For example, if the screen network state is represented by the table in FIG. 3, the "theater mode" state is updated to "on". The screen begins lowering (612). When the screen is half down, a network event associated with the half down screen is broadcast (620). When the screen is fully down, a network event associated with the fully down screen is broadcast (628).

An interrupt event or message may be detected, for example, if a user changes his mind after requesting theater mode. When the interrupt event is detected, the network state on the projector is updated and the screen is raised. When other devices receive an interrupt event or message, similar behavior occurs. The device updates its tracked network state and determines an action to perform in order to return to a state prior to when the interrupted request was made.

Figure 7:
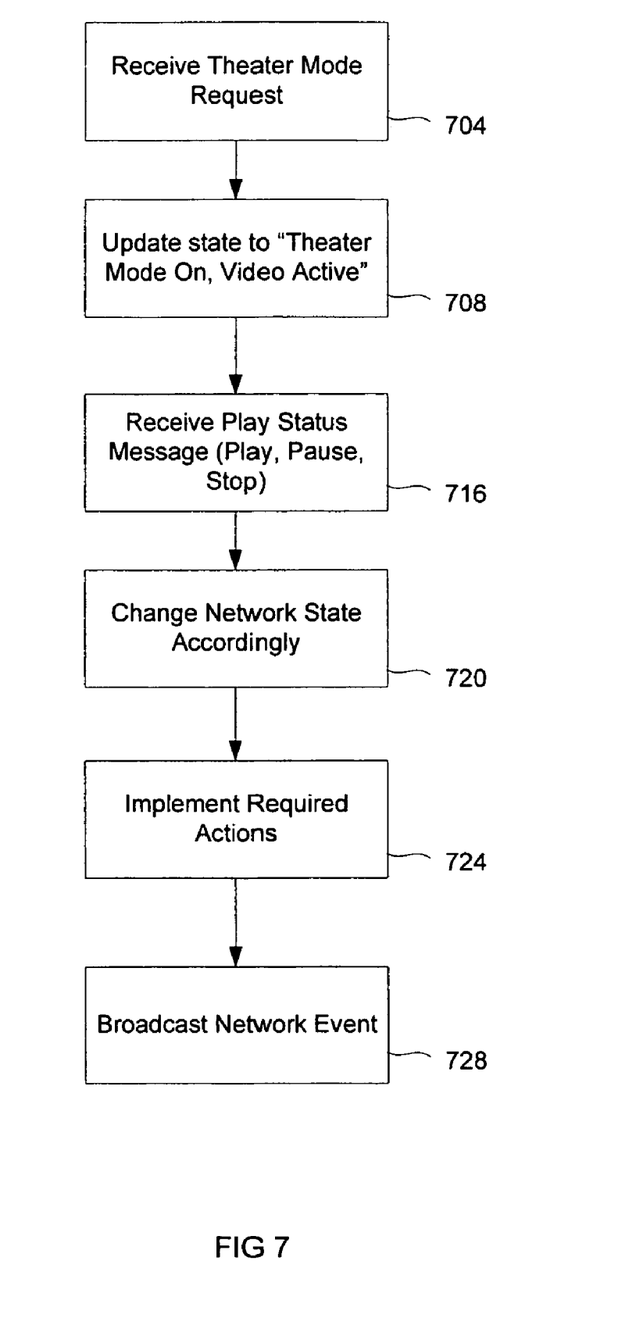
FIG. 7 is a flowchart illustrating a method for responding to a theater mode network event on a lighting device.

FIG. 7 is a flowchart illustrating a method for responding to a theater mode network event on a lighting device. In this example, a request for theater mode is received (704). For example, the request may be received by detecting a network event, such as the network event broadcast in step 220. The network state on the lighting device is updated to reflect the received request (708). For example, if the lighting device network state is represented by the table in FIG. 3, the "theater mode" state is updated to "on" and the "video" state is updated to "active, source DVD". A play status message is received (716). For example, the message may indicate that a video source is now playing. The message may also indicate that the video source is now stopped or paused. The request may be received by detecting a network event. The network state is changed appropriately (720). For example, if the lighting device network state is represented by the table in FIG. 3, the "video" state is updated to "play", "stop", or "pause" as appropriate. Required actions are implemented (724). For example, a required action may be to fade light 1 when the video is playing. A network event associated with the action is broadcast (728). For example, a network event associated with light 1 fading may be broadcast.

Figure 8:
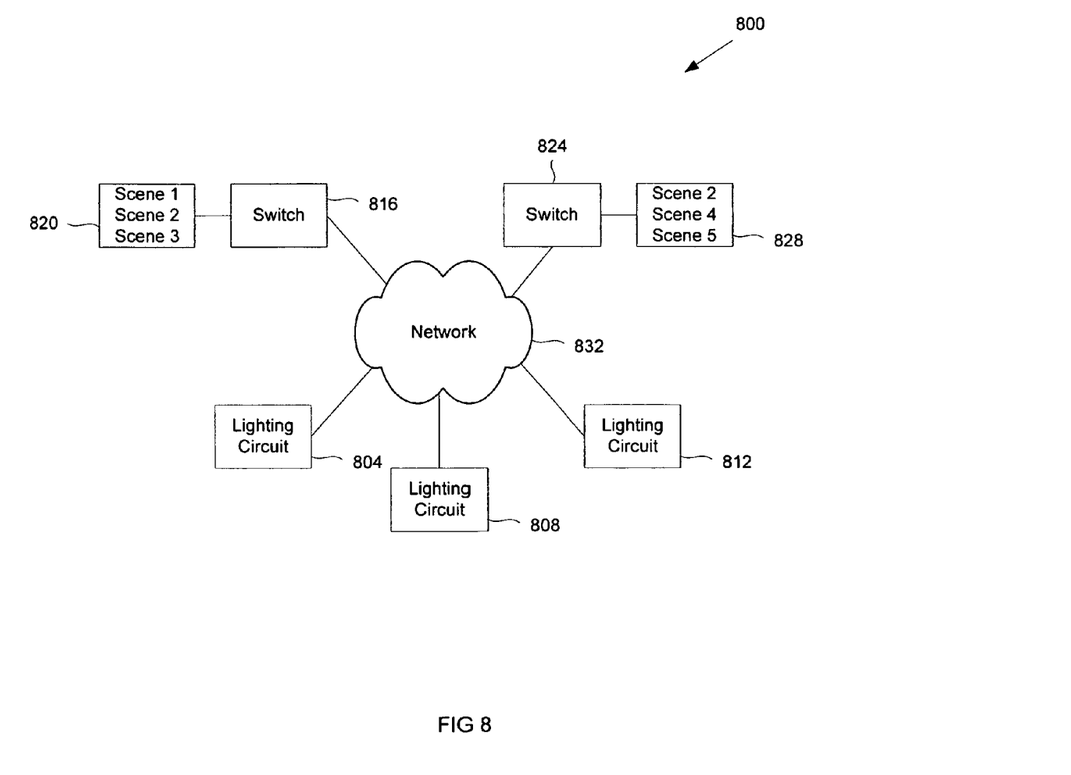
FIG. 8 is a block diagram illustrating a network 832 that includes lighting control.

FIG. 8 is a block diagram illustrating a network 832 that includes lighting control. In this example, network 800 includes a lighting circuit 804, a lighting circuit 808, a lighting circuit 812, a switch 816, and a switch 824. Switch 816 includes input device 820 for selecting scene 1, scene 2, or scene 3. Switch 824 includes input device 828 for selecting scene 2, scene 4, or scene 5. In one embodiment, switch 816 is located in a hallway, switch 824 is in a kitchen, lighting circuit 804 controls lights in a garage, lighting circuit 808 controls lights upstairs, and lighting circuit 812 controls lights downstairs. In some embodiments, switch 816 controls an X10 system. In some embodiments, switch 828 controls an X10 system.

Figure 9:
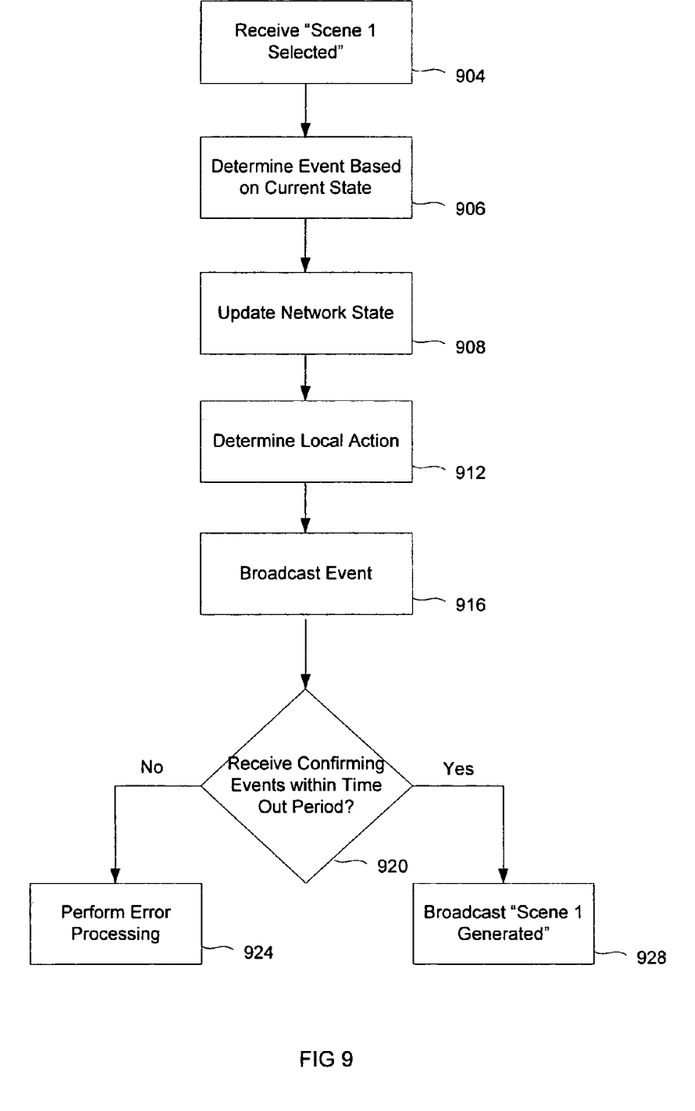
FIG. 9 is a flowchart illustrating a method for responding to a lighting scene request.

FIG. 9 is a flowchart illustrating a method for responding to a lighting scene request at switch 816 in network 800. In this example, a request for scene 1 is received (904). The request may be received when a user selects scene 1 using input device 820. An event is determined based on the current state of the device (906). For example, switch 816 determines a network event that indicates that scene 1 is active. Alternatively, switch 816 may first decode scene 1, then determine network events based on the decoded information. For example, if scene 1 is defined so that a light on lighting circuit 1 is dimmed by 25% and lighting circuit 2 is off, switch 816 might first decode this information, and then determine a network event indicating that lighting circuit 1 is dimmed by 25% and a network event indicating that lighting circuit 2 is off.

The network state on the controller is updated to reflect the received request (908). For example, if the lighting device network state is represented by the table in FIG. 3, the "scene 1" state is updated to "on" and the "video" state is updated to "active, source DVD". Local action is determined (912). An example of a local action includes lighting an LED to indicate that scene 1 has been selected. The event or events determined in step 906 are broadcast (916).

Lighting circuit 1 and lighting circuit 2 receive the network event, update their respective network states, and each determine an action based on the received event. For example, if lighting circuit 1 receives a scene 1 network event, it decodes scene 1 to mean that a light on lighting circuit 1 is dimmed by 25%, and determines that the light should be dimmed by 25%. Similarly, if lighting circuit 2 receives a scene 1 network event, it decodes scene 1 to mean that lighting circuit 2 is off, and determines that lighting circuit 2 should be off. Alternatively, if lighting circuit 1 receives a network event associated with dimming a light on lighting circuit 1 by 25%, it determines that one of its lights should be dimmed by 25%. Similarly, if lighting circuit 2 receives a network event associated with turning off light circuit 2, it determines that lighting circuit 2 should be off.

The actions determined at each lighting circuit are performed and each lighting circuit sends a broadcast event associated with completion of the action or actions. It is determined whether these confirming events are received within a time out period (920). If they are, switch 816 broadcasts a message associated with scene 1 being generated (928). If they aren't, switch 816 may perform appropriate error processing (924). For example, switch 816 may perform an error sequence.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of controlling a plurality of devices in a building including:
   detecting at a first device a first network event sent by a second device;
   updating a network state on the first device, based on the first network event, to reflect a first change in the network state;
   determining at the first device an action based on the network state; and
   transmitting a second network event, wherein the second network event reflects a second change in the network state associated with the action.

2. The method of claim 1, wherein transmitting includes using a reliable protocol to transmit a second network event to the devices.

3. The method of claim 1, wherein transmitting includes broadcasting a second network event to the devices.

4. The method of claim 1, wherein the network state on the first device is a filtered network state.

5. The method of claim 1, further including performing the action at the first device.

6. The method of claim 1, further including transmitting the first network event before detecting.

7. The method of claim 1, further including broadcasting the first network event to the devices before detecting.

8. The method of claim 1, wherein the second network event is associated with the action.

9. The method of claim 1, wherein the action determined at the first device is to stand by.

10. The method of claim 1, further including:
    performing the action at the first device; and
    determining whether or not the action was successful.

11. The method of claim 1, further including:
    performing the action at the first device; and
    determining at a third device whether or not the action was successful.

12. The method of claim 1, further including:
    performing the action at the first device; and
    determining at a third device whether or not the action was successful based on the second network event.

13. The method of claim 1, further including
    performing the action at the first device;
    determining whether or not the action was successful; and
    performing intelligent error correction if the action was unsuccessful.

14. The method of claim 1, further including:
    performing the action at the first device;
    determining whether or not the action was successful including:
    performing intelligent error correction if determining whether or not the action was successful is not completed within a time out period.

15. The method of claim 1, wherein the network state includes a device state.

16. The method of claim 1, further including configuring the first device before detecting.

17. The method of claim 1, further including configuring the first device before detecting including downloading an executable to the first device.

18. The method of claim 1, further including configuring the first device before detecting including downloading an executable to the first device from a central processor.

19. The method of claim 1, further including monitoring the network state based on the first network event.

20. The method of claim 1, further including receiving the second network event at a third device.

21. The method of claim 1, wherein the second network event is transmitted in an event-specific format.

22. The method of claim 1, further including processing the first network event in an event-specific format on the first device.

23. The method of claim 1, further including:
    pre-processing the second network event into a canonical format before transmitting; and
    post-processing the network event in the canonical format on a third device;
    wherein the canonical format is a generic format that can represent multiple event-specific formats.

24. The method of claim 1, wherein the first device includes a controller that controls one or more devices.

25. The method of claim 1, wherein the first device includes a generic controller that controls one or more devices and wherein the generic controller is not specific to the devices it controls.

26. The method of claim 1, wherein the first device includes a controller that controls one or more devices over an IR connection.

27. The method of claim 1, wherein the first device includes a controller that controls one or more devices over a serial connection.

28. The method of claim 1, wherein:
    the first device includes a controller that controls one or more devices over a serial connection and
    a device controlled by the controller performs the action.

29. The method of claim 1, wherein a network associated with the first network event is in a star, bus, or ring topology.

30. The method of claim 1, wherein a network associated with the first network event is a home network.

31. The method of claim 1, wherein a network associated with the first network event is an office network.

32. The method of claim 1, wherein the first device is a wireless device.

33. The method of claim 1, wherein the network associated with the first network event is a local area network based on an IEEE 802.11 standard.

34. The method of claim 1, wherein:
the first device is a lighting device;
the first network event includes a lighting scene request; and
the action determined at the lighting device is to generate the lighting scene.

35. The method of claim 1, wherein:
the first device controls a projector;
the first network event includes a theater mode request; and
the action determined at the projector is to turn on the projector.

36. The method of claim 1, wherein:
the first device controls a screen;
the first network event includes a theater mode request; and
the action determined at the screen is to begin lowering the screen.

37. The method of claim 1, wherein:
the first device controls a projector;
the first network event includes an indication that a screen is half lowered; and
the action determined at the projector is to turn on the projector.

38. The method of claim 1, wherein:
the first device is a lighting device;
the first network event includes a request to pause a video player; and
the action determined at the lighting device is to turn on a light.

39. The method of claim 1, wherein:
the first device is a lighting device;
the first network event includes a request to pause a video player; and
the action determined at the lighting device is to set a light at a dimmed setting.

40. The method of claim 1, wherein:
the first device is a video player; and
the first network event indicates that a screen is lowered;
the action determined at the video player is to play a video.

41. The method of claim 1, wherein:
the first device is a screen;
the first network event includes a request to cancel theater mode;
the action determined at the screen is to raise the screen.

42. The method of claim 1, wherein:
the first network event is a vacation mode request; and
the action determined at the first device is based on an action performed at the first device at a time in the past.

43. The method of claim 1, wherein:
the first network event includes a vacation mode request; and
the action determined at the first device is based on an action performed at the first device at the same time of day in the past.

44. The method of claim 1, wherein the first network event is time based.

45. The method of claim 1, wherein the first network event is timer based.

46. The method of claim 1, wherein the first network event is event driven.

47. The method of claim 1, wherein the first network event is sequentially defined relative to the second network event.

48. A system for controlling a plurality of devices in a building including:
a processor configured to:
detect a first network event;
update a network states based on the first network event, to reflect a first change in the network state;
determine an action based on the updated network state determined at the first device; and
transmit a second network event that reflects a second change in the network state associated with the action; and
a memory coupled with the processor, wherein the memory provides the processor with instructions.

49. A computer program product for controlling a plurality of devices in a building, the computer program product being embodied in a computer readable medium and comprising computer instructions for:
detecting at a first device a first network event sent by a second device;
updating a network state on the first device, based on the first network event, to reflect a first change in the network state;
determining at the first device an action based on the network state; and
transmitting a second network event that reflects a second change in the network state associated with the action.

* * * * *

UNITED STATES PATENT AND TRADEMARK OFFICE
CERTIFICATE OF CORRECTION

PATENT NO. : 7,092,768 B1
APPLICATION NO. : 10/796904
DATED : August 15, 2006
INVENTOR(S) : David S. Labuda It is certified that error appears in the above-identified patent and that said Letters Patent is hereby corrected as shown below:

Claim 48
Column 10, line 29 delete "network states based" and insert -- network state, based --

Signed and Sealed this

Fifteenth Day of September, 2009

David J. Kappos
*Director of the United States Patent and Trademark Office*